UNITED STATES PATENT OFFICE.

OSCAR GÜNTHER AND LEOPOLD HESSE, OF ELBERFELD, AND ARTHUR ZART, OF VOHWINKEL, GERMANY, ASSIGNORS TO FARBENFABRIKEN VORM. FRIEDR. BAYER & CO., OF ELBERFELD, GERMANY, A CORPORATION OF GERMANY.

AZO DYE.

982,952.  Specification of Letters Patent. Patented Jan. 31, 1911.

No Drawing.  Application filed April 19, 1910. Serial No. 556,387.

*To all whom it may concern:*

Be it known that we, OSCAR GÜNTHER, LEOPOLD HESSE, and ARTHUR ZART, doctors of philosophy, chemists, citizens of the German Empire, residing, respectively, at Freyastrasse 77, Elberfeld, Boltenbergstrasse 32, Elberfeld, and Yorkstrasse 18, Vohwinkel, Germany, have invented new and useful Improvements in Azo Dyes, of which the following is a specification.

This invention relates to the preparation of new azo dyestuffs which are obtained by combining in alkaline or neutral solution the diazo compounds of unsulfonated nitroamins of the benzene series, especially, nitranilins and their derivatives *e. g.* 2-nitro-4-acetyl-paraphenylenediamin, 4-nitro-2-anisidin ($OCH_3:NH_2:NO_2=1:2:4$), 5-nitro-2-anisidin ($OCH_3:NH_2:NO_2=1:2:5$), 5-nitro-2-toluidin ($CH_3:NH_2:NO_2=1:2:5$), 2-chloro-4-nitranilin, nitro-anthranilic acids, 2.6-dibromo-4-nitranilin etc. with substituted 2-amino-8-naphthal-6-sulfonic acids, especially 2-alkylamino-, 2-arylamino-, 2-aralkyl-amino-8-naphthol-6-sulfonic acids and their derivatives substituted in 1-position *e. g.* the 1.2-naphthimidazol-8-oxy-6-sulfonic acids, the 1.2-naphthothiazol-8-oxy-6-sulfonic acids etc.

The new dyestuffs are after being dried and pulverized in the shape of their alkaline salts dark powders soluble in water; yielding upon reduction with stannous chlorid and hydrochloric acid an unsulfonated benzene compound containing at least two amino groups and substituted 7-amino-2-amino-8-naphthol-6-sulfonic acids. They produce on wool from an acid bath red to brown to black shades of good fastness to light and to milling.

In order to illustrate the new process more fully the following example is given, the parts being by weight: 168 parts of 4-nitro-2-anisidin are dissolved by boiling them in 1000 parts of a 20 per cent. hydrochloric acid and 700 parts of water. The solution is cooled to about 15° C. by the addition of ice and is then diazotized by means of 69 parts of sodium nitrite. The diazo compound is then added at 0° C., while stirring to an aqueous solution of 315 parts of 2-phenyl-amino-8-naphthol-6-sulfonic acid containing an excess of sodium carbonate. The combination is complete after a short time.

The dyestuff is isolated in the usual way. It is after being dried and pulverized in the shape of its sodium salt a dark powder soluble in concentrated sulfuric acid with a violet-red color; yielding upon reduction with stannous chlorid and hydrochloric acid 2.4-diamino-anisol and 7-amino-2-phenyl-amino-8-naphthol-6-sulfonic acid; and dyeing wool from an acid bath a full brown.

We claim:

1. The herein described new azo dyestuffs obtainable from unsulfonated nitroamins of the benzene series and substituted 2-amino-8-naphthol-6-sulfonic acids which are after being dried and pulverized in the shape of their sodium salts dark powders, yielding upon reduction with stannous chlorid and hydrochloric acid an unsulfonated benzene compound containing at least two amino groups and substituted 7-amino-2-amino-8-naphthol-6-sulfonic acids, and dyeing wool from red to brown to black shades, substantially as described.

2. The herein described new azo dyestuff obtainable from nitroaminoanisol and 2-phenylamino-8-naphthol-6-sulfonic acid, which dye is after being dried and pulverized in the shape of its sodium salt a dark powder soluble in concentrated sulfuric acid with a violet-red color; yielding upon reduction with stannous chlorid and hydrochloric acid 2.4-diaminoanisol and 7-amino-2-phenyl-amino-8-naphthol-6-sulfonic acid; and dyeing wool brown shades, substantially as described.

In testimony whereof we have hereunto set our hands in the presence of two subscribing witnesses.

OSCAR GÜNTHER. [L. S.]
LEOPOLD HESSE. [L. S.]
ARTHUR ZART. [L. S.]

Witnesses:
 OTTO KÖNIG,
 WILLY KLEIN.